US010157041B1

(12) United States Patent  
Ledet

(10) Patent No.: US 10,157,041 B1  
(45) Date of Patent: *Dec. 18, 2018

(54) PROCESSING MULTIPLE AUDIO SIGNALS ON A DEVICE

(71) Applicant: OPEN INVENTION NETWORK LLC, Durham, NC (US)

(72) Inventor: David Gerard Ledet, Allen, TX (US)

(73) Assignee: Open Invention Network LLC, Durham, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/810,598

(22) Filed: Nov. 13, 2017

Related U.S. Application Data

(63) Continuation of application No. 15/052,417, filed on Feb. 24, 2016, now Pat. No. 9,817,635.

(60) Provisional application No. 62/119,915, filed on Feb. 24, 2015.

(51) Int. Cl.
G06F 3/16 (2006.01)
H04R 1/40 (2006.01)
H04R 3/00 (2006.01)

(52) U.S. Cl.
CPC .............. *G06F 3/167* (2013.01); *G06F 3/165* (2013.01); *H04R 1/406* (2013.01); *H04R 3/005* (2013.01); *H04R 2430/01* (2013.01); *H04R 2499/11* (2013.01)

(58) Field of Classification Search
CPC ........ H04B 1/3833; H04H 60/05; G06F 3/165
USPC ..................... 381/17, 77; 340/407.1; 700/94; 455/416
See application file for complete search history.

(56) References Cited

U.S. PATENT DOCUMENTS

| 6,128,318 | A  | * | 10/2000 | Sato | G06F 1/14 370/503 |
| 6,611,678 | B1 | * | 8/2003  | Zweig | H03J 1/0075 455/161.3 |
| 7,007,106 | B1 | * | 2/2006  | Flood | H04J 3/0655 370/503 |
| 7,483,538 | B2 | * | 1/2009  | McCarty | H04R 5/02 381/77 |
| 7,483,958 | B1 | * | 1/2009  | Elabbady | G06F 21/10 709/217 |
| 2003/0099212 | A1 | * | 5/2003 | Anjum | H04W 92/02 370/328 |
| 2007/0226530 | A1 | * | 9/2007 | Celinski | G06F 1/12 713/500 |
| 2008/0089268 | A1 | * | 4/2008 | Kinder | H04L 1/0015 370/315 |
| 2009/0264114 | A1 | * | 10/2009 | Virolainen | H04M 3/56 455/416 |
| 2009/0298420 | A1 | * | 12/2009 | Haartsen | H04J 3/0658 455/3.06 |
| 2010/0316237 | A1 | * | 12/2010 | Elberbaum | H04M 11/025 381/300 |

(Continued)

*Primary Examiner* — Mohammad Islam

(57) ABSTRACT

At least one processor that performs at least one of determine at least two audio signals, determine at least one directionality of at least one audio source from the at least two audio signals, determine at least one timing of the at least one audio source from the at least two audio signals, generate at least one context for the at least two audio signals based on the at least one directionality and the at least one timing of the at least two audio signals, and provide at least one user interface based on the generated at least one context.

20 Claims, 13 Drawing Sheets

Non-Transitory Computer Readable Medium Flow Diagram Of The Cellular Call Context

(56) References Cited

U.S. PATENT DOCUMENTS

| | | | | |
|---|---|---|---|---|
| 2011/0095875 | A1* | 4/2011 | Thyssen | G09G 5/10 340/407.1 |
| 2012/0010737 | A1* | 1/2012 | Sakagami | H04S 7/301 700/94 |
| 2012/0058727 | A1* | 3/2012 | Cook | H04R 5/02 455/41.3 |
| 2012/0070004 | A1* | 3/2012 | LaBosco | H04H 20/30 381/2 |
| 2012/0087503 | A1* | 4/2012 | Watson | H04S 3/008 381/23 |
| 2013/0279888 | A1* | 10/2013 | Zeng | H04N 21/4307 386/357 |
| 2014/0323036 | A1* | 10/2014 | Daley | H04H 20/08 455/3.06 |
| 2014/0328485 | A1* | 11/2014 | Saulters | G06F 3/165 381/17 |
| 2015/0215722 | A1* | 7/2015 | Milne | H04S 7/305 381/300 |
| 2016/0350067 | A1* | 12/2016 | Sundaresan | G06F 3/165 |
| 2016/0359512 | A1* | 12/2016 | Fathollahi | H04B 1/3833 |

* cited by examiner

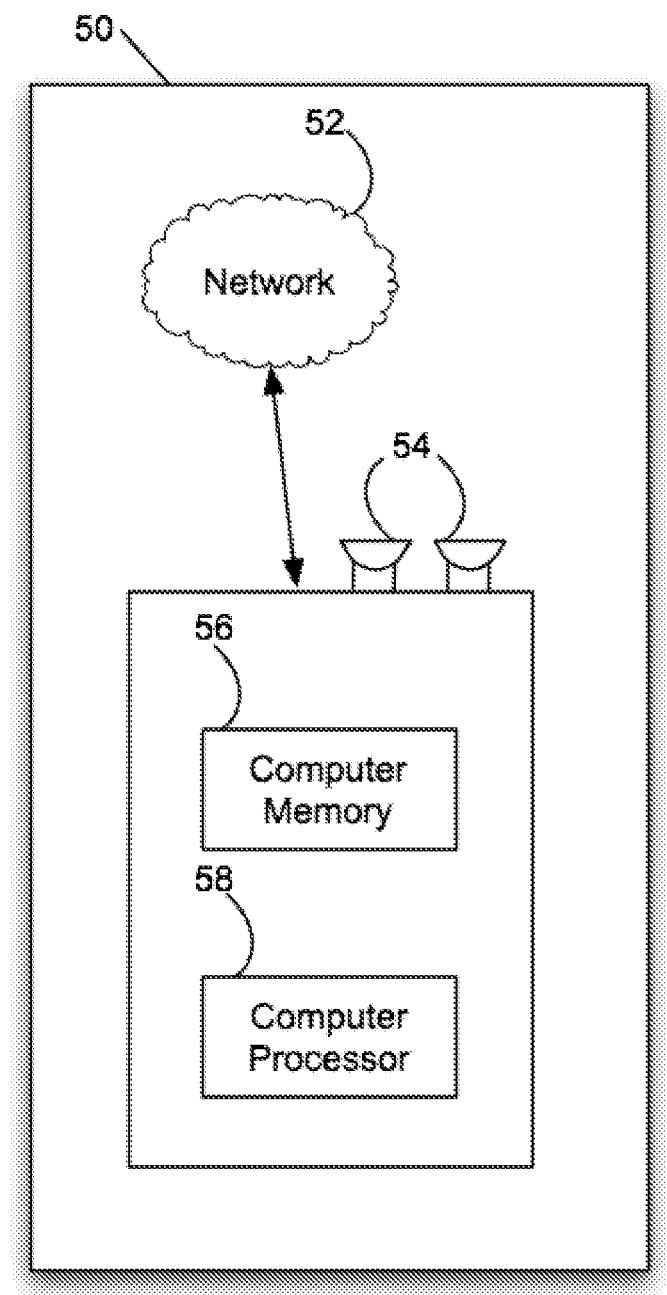
Figure 1 System Diagram

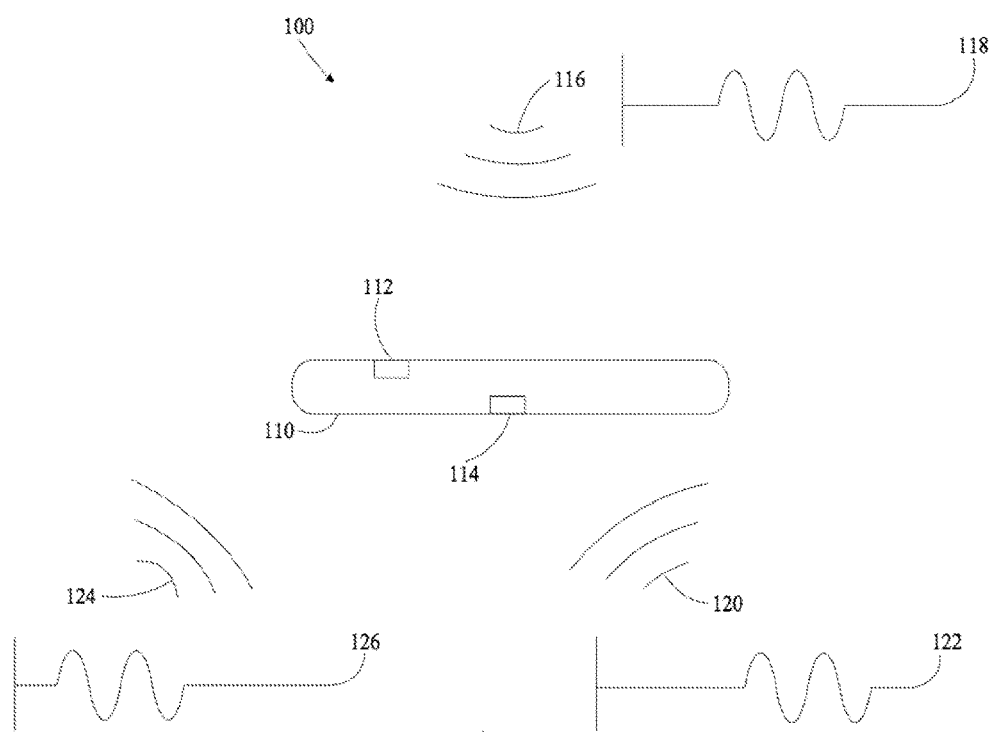
Figure 2 Cellular Call Context System

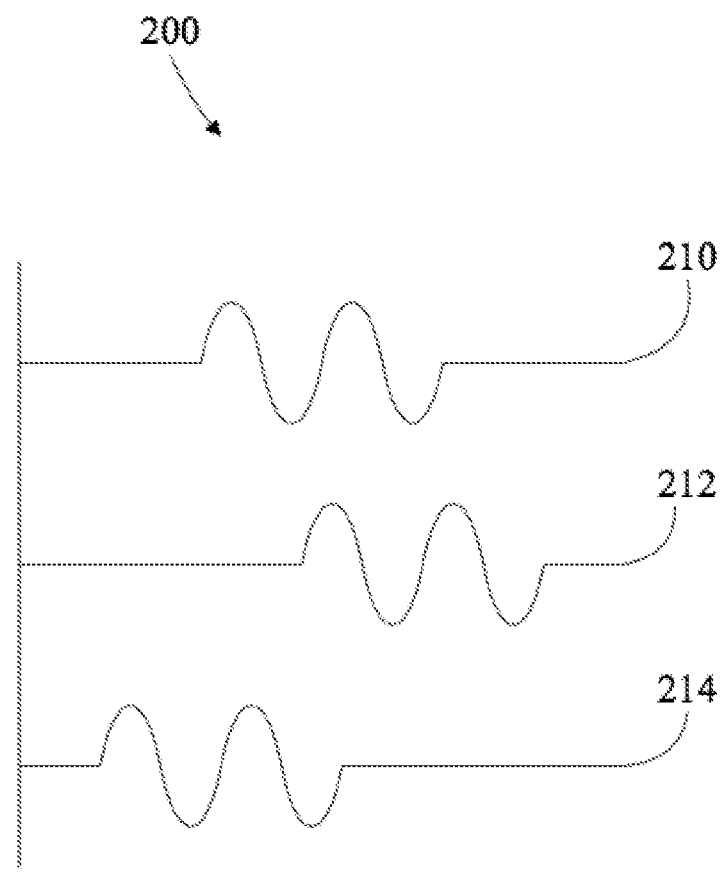
Figure 3 Audio Signal Timing

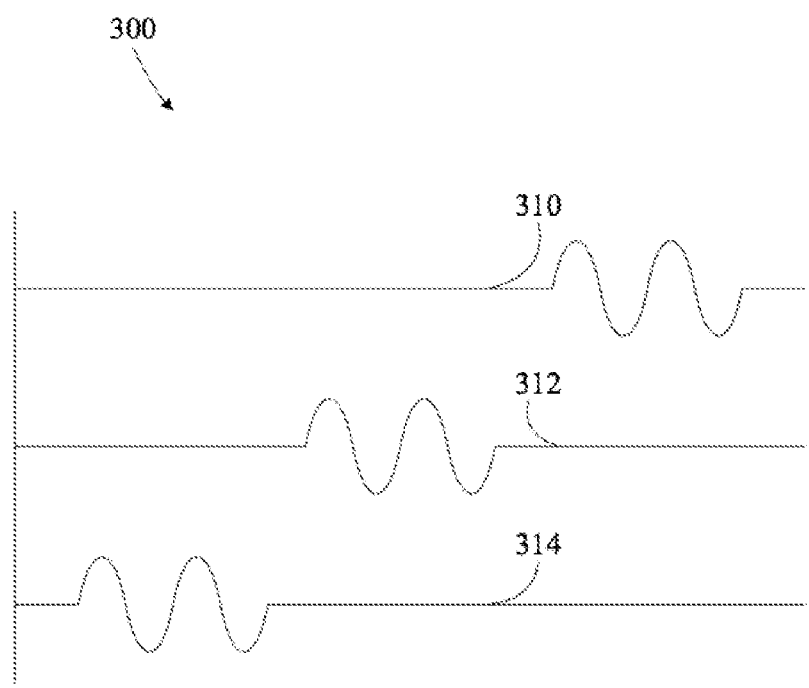
Figure 4 Audio Signal Timing 2

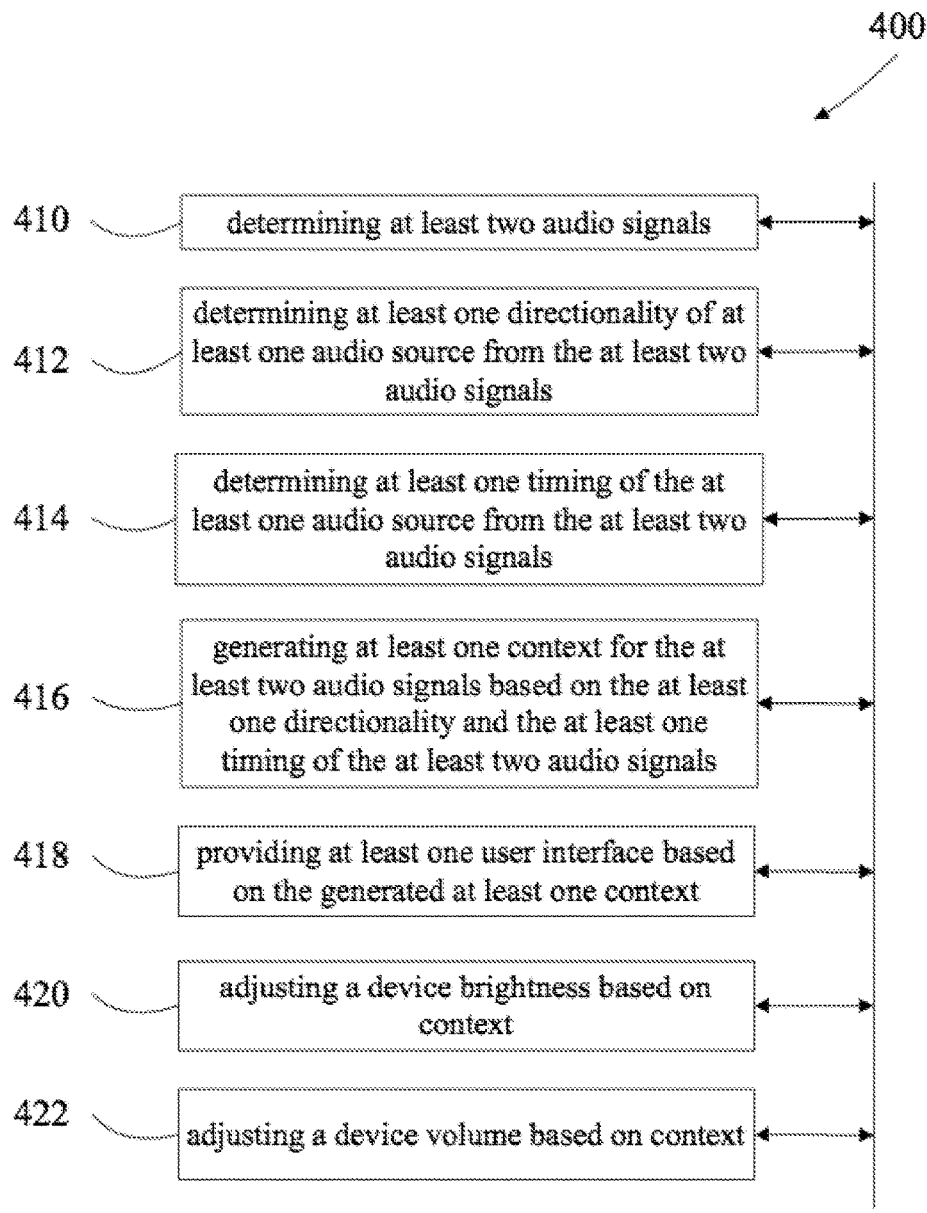
Figure 5 Flow Diagram Of Cellular Call Context Method

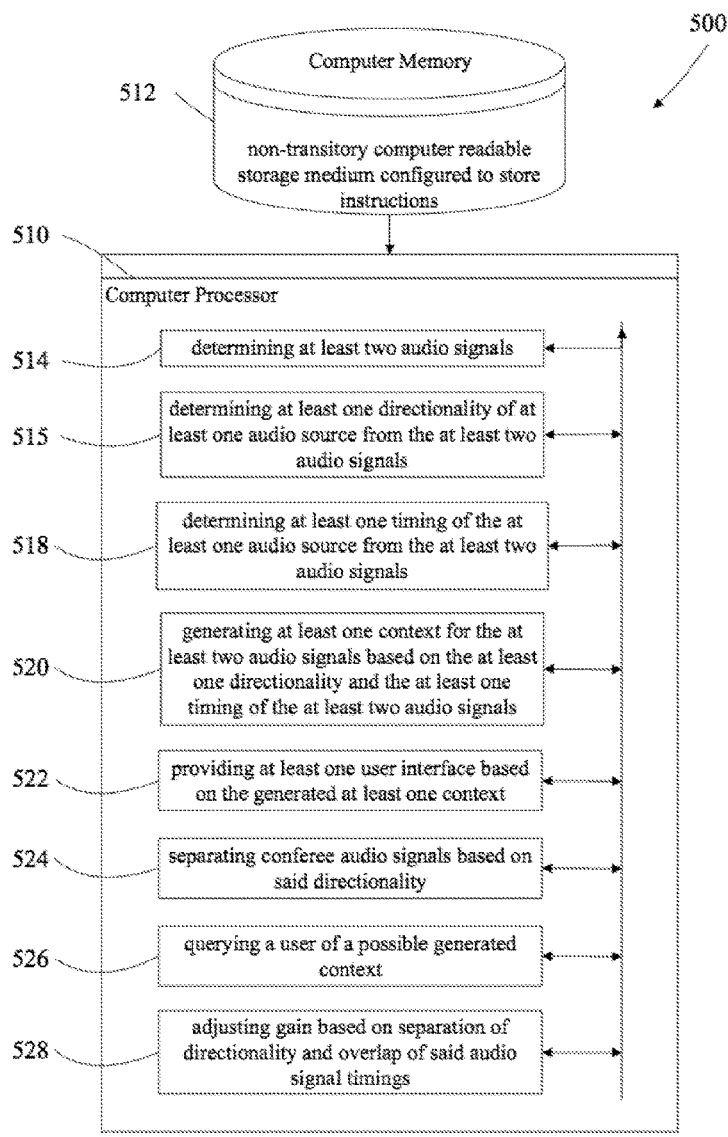
Figure 6 Non-Transitory Computer Readable Medium Flow Diagram Of The Cellular Call Context

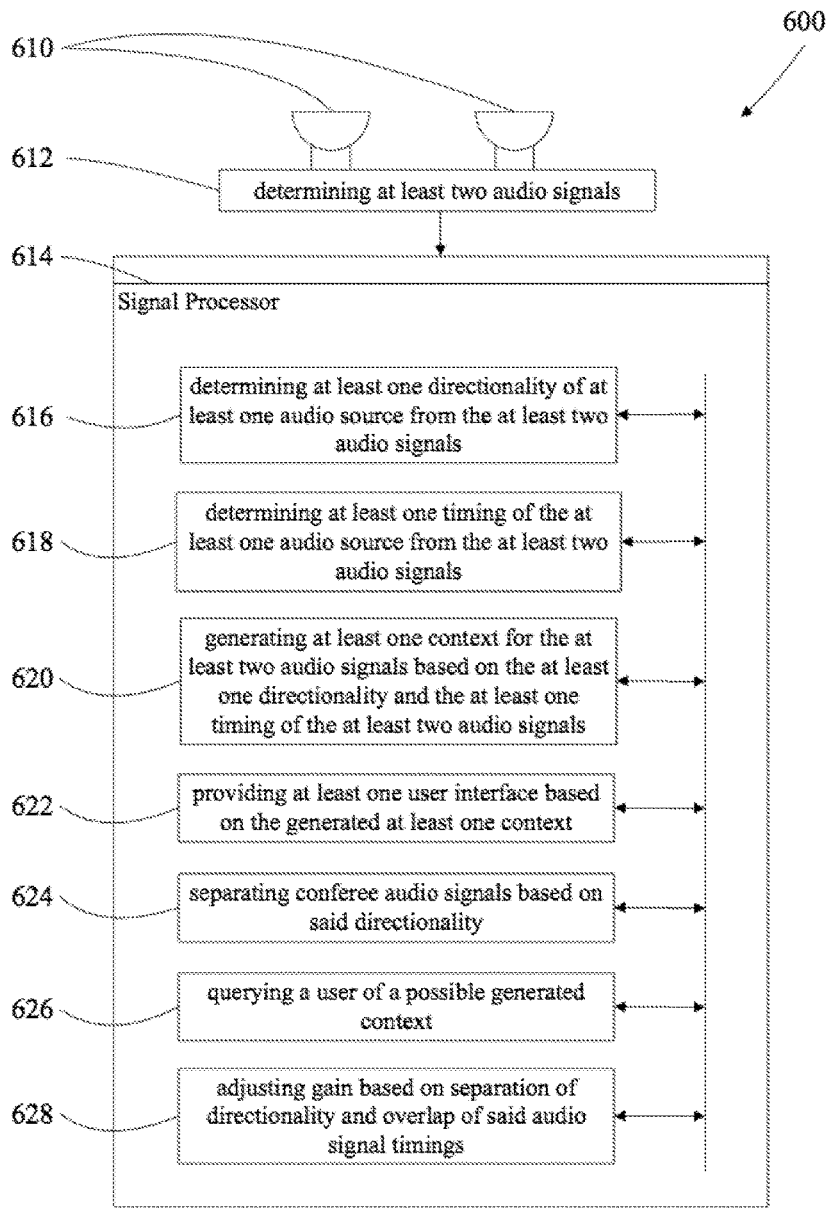
Figure 7 Apparatus System Flow Diagram of The Cellular Call Context

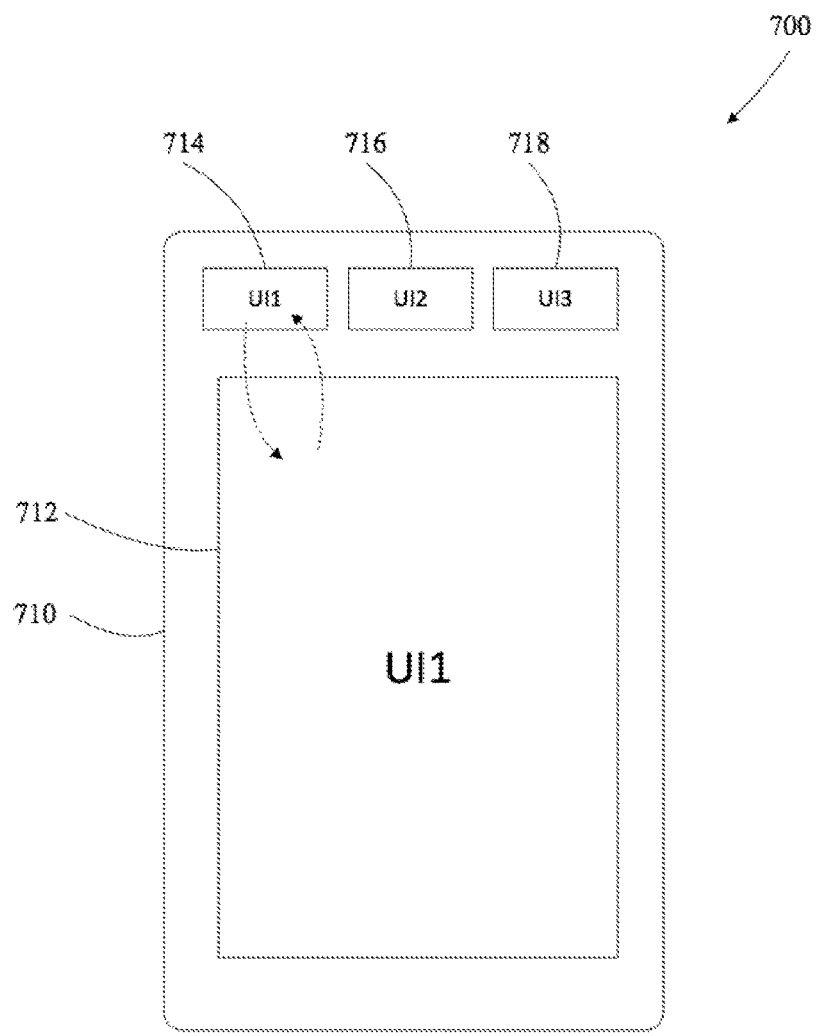
Figure 8 Cellular Call Context User Interface 1

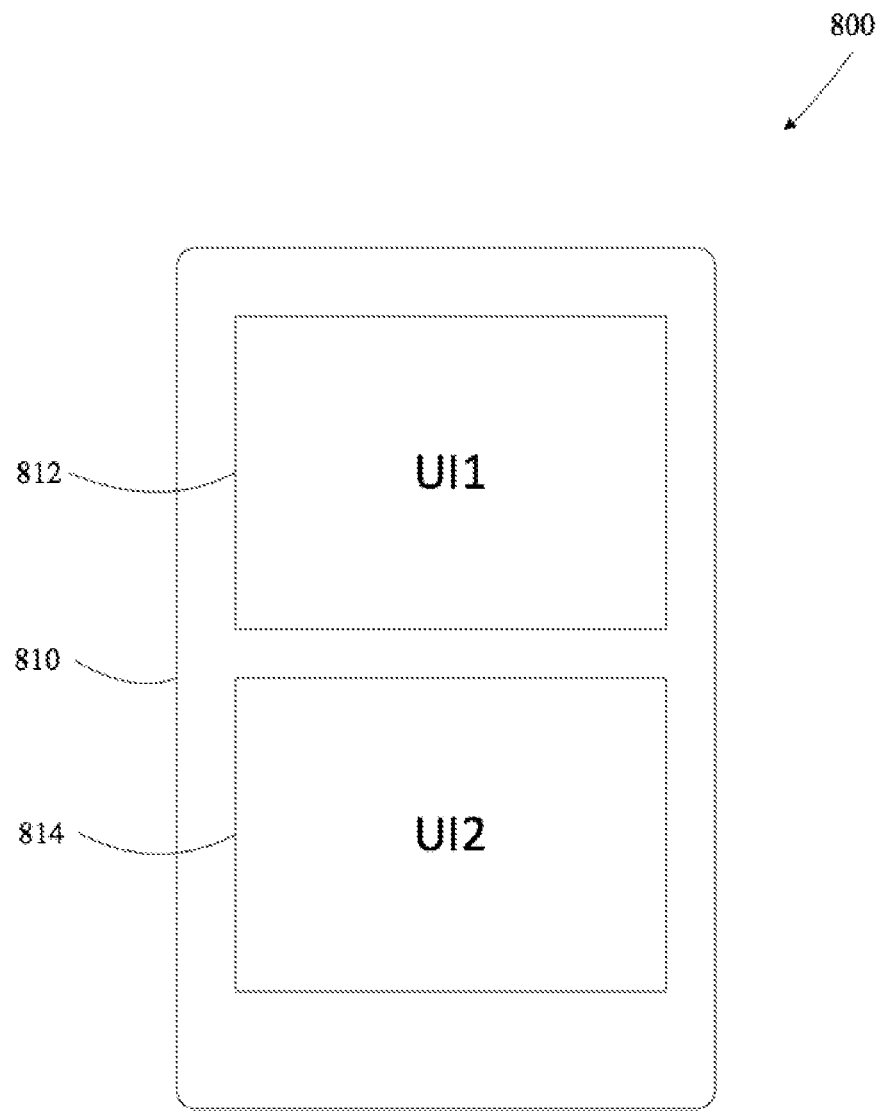
Figure 9 Cellular Call Context User Interface 2

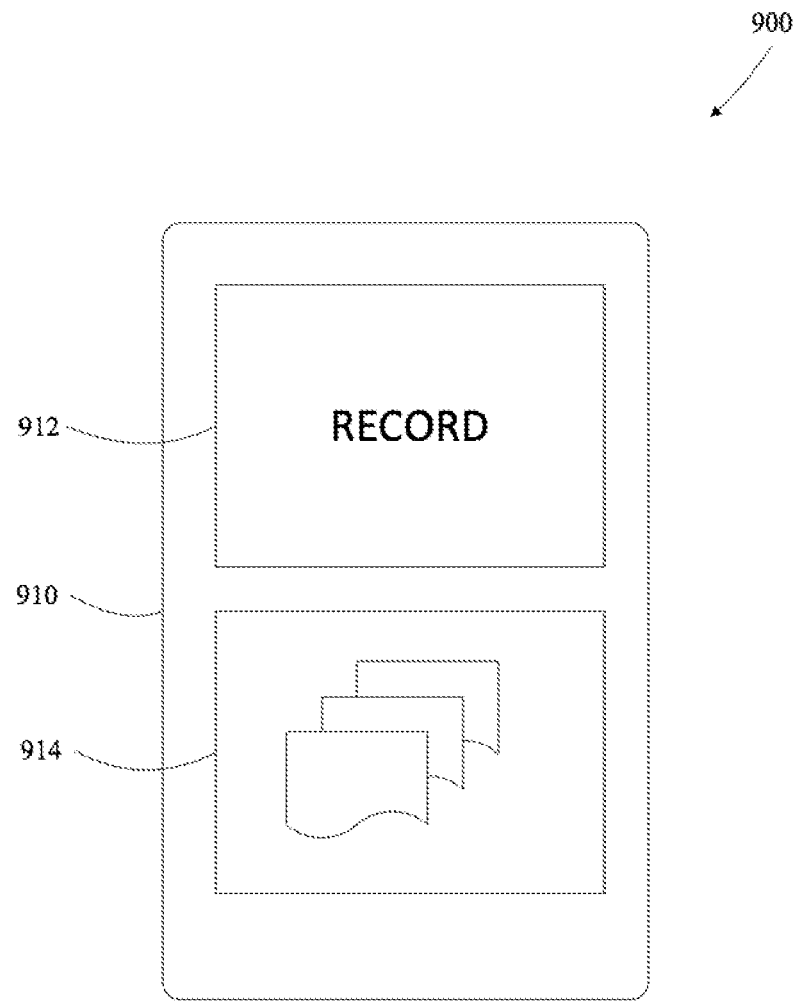
Figure 10 Cellular Call Context User Interface 3

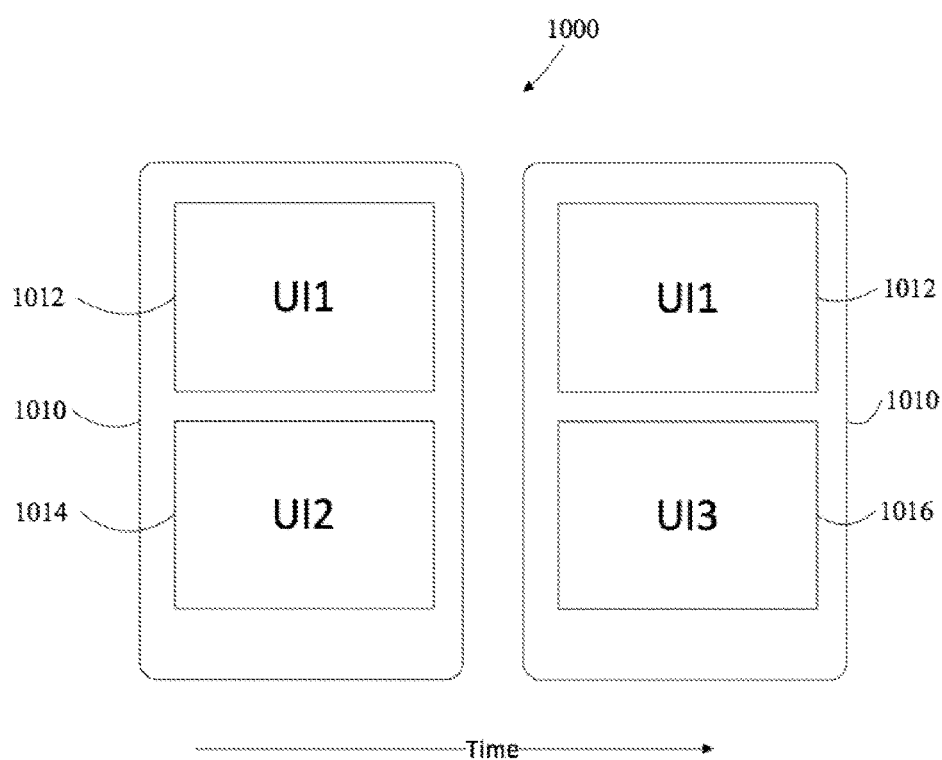
Figure 11 Cellular Call Context User Interface 4

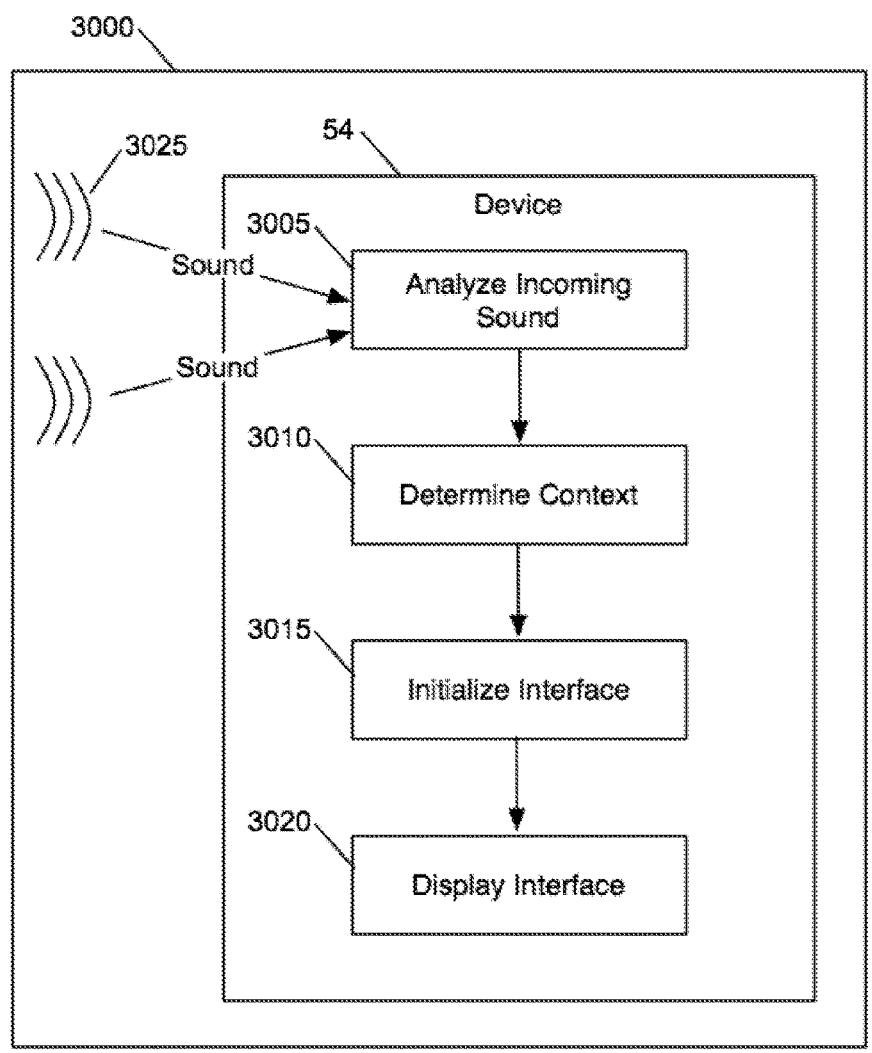
Figure 12 Interface Initialization 1

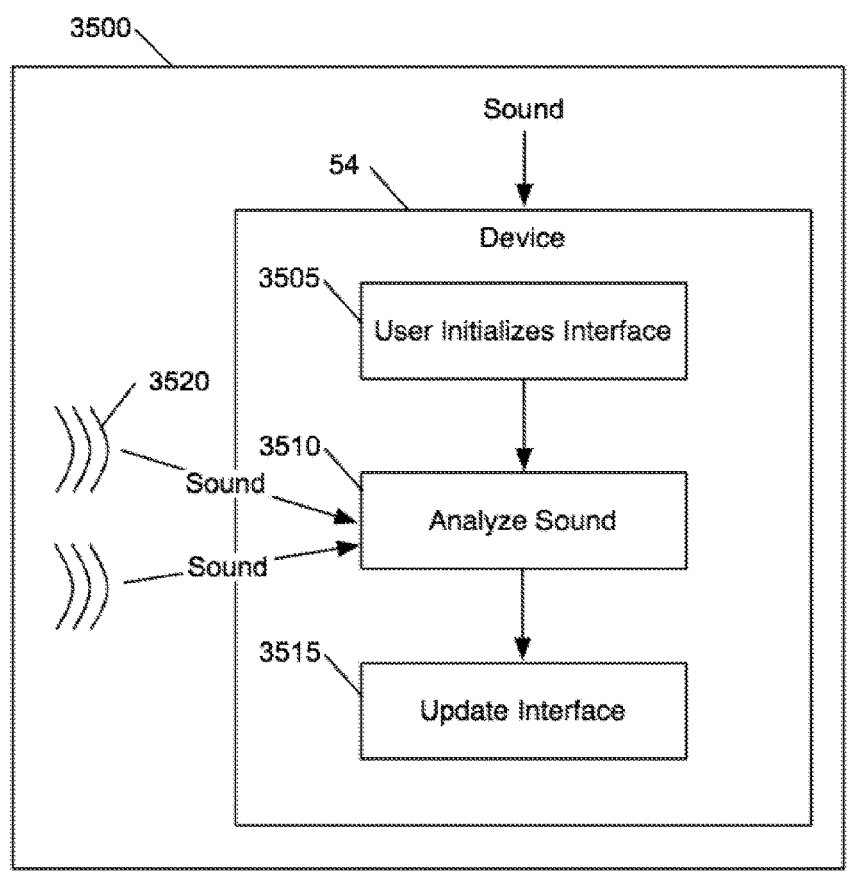
Figure 13 Interface Initialization 2

PROCESSING MULTIPLE AUDIO SIGNALS ON A DEVICE

CROSS-REFERENCE TO RELATED APPLICATIONS

The instant application is a continuation of U.S. patent application Ser. No. 15/052,417, filed Feb. 24, 2016, titled PROCESSING MULTIPLE AUDIO SIGNALS ON A DEVICE, now issued U.S. Pat. No. 9,817,635, issued Nov. 14, 2017, and is related to and claims benefit from Provisional U.S. Patent Application No. 62/119,915, filed on Feb. 24, 2015 and titled DATA, the entire contents of which are incorporated by reference herein.

BACKGROUND

Currently, devices, such as wireless devices or cell/smart phones having more than one microphone utilize the secondary microphones for noise cancellation in noisy environments such as external conversation noise and the like.

There is an unsolved need to be able to create context-aware devices, such as wireless devices or cell phones which can automatically adjust microphone gains to match a particular situation, such as riding on a subway, riding in a car, having a teleconference and the like. In specific circumstances, there are needs to provide individual speaker relational position awareness in public and private settings. There is a need for a device to collect conversation and other information to determine a context for that conversation.

SUMMARY

At least one processor that performs at least one of determine at least two audio signals, determine at least one directionality of at least one audio source from the at least two audio signals, determine at least one timing of the at least one audio source from the at least two audio signals, generate at least one context for the at least two audio signals based on the at least one directionality and the at least one timing of the at least two audio signals, and provide at least one user interface based on the generated at least one context.

A method comprises at least one of determining at least two audio signals, determining at least one directionality of at least one audio source from the at least two audio signals, determining at least one timing of the at least one audio source from the at least two audio signals, generating at least one context for the at least two audio signals based on the at least one directionality and the at least one timing of the at least two audio signals and providing at least one user interface based on the generated at least one context. The method further comprises at least one of displaying the at least one user interface on a device, adjusting a device brightness based on the at least one context, adjusting a device volume based on the at least one context, wherein the at least two audio signals may represent one audio source, wherein the at least one user interface may display at least one most probable context, based on the generated at least one context, wherein the at least one most probable context is based on a global position signal.

A non-transitory computer readable medium comprising instructions that when executed by a processor, cause the processor to perform at least one of determining at least two audio signals, determining at least one directionality of at least one audio source from the at least two audio signals, determining at least one timing of the at least one audio source from the at least two audio signals, generating at least one context for the at least two audio signals based on the at least one directionality and the at least one timing of the at least two audio signals and providing at least one user interface based on the generated at least one context.

A cellular call context, comprising at least one of determining at least two audio signals determining at least one directionality of at least one audio source from the at least two audio signals, determining at least one timing of the at least one audio source from the at least two audio signals, generating at least one context for the at least two audio signals based on the at least one directionality and the at least one timing of the at least two audio signals and providing at least one user interface based on the generated at least one context.

In one embodiment, a method comprises at least one of, determining at least two audio signals, determining at least one directionality of at least one audio source from the at least two audio signals, determining at least one timing of the at least one audio source from the at least two audio signals, generating at least one context for the at least two audio signals based on the at least one directionality and the at least one timing of the at least two audio signals and providing at least one user interface based on the generated at least one context.

In another embodiment, an apparatus comprising at least one processor and at least one memory including computer code for one or more programs, the at least one memory and the computer code configured to with the at least one processor cause the apparatus at least to perform at least one of determine at least two audio signals, determine at least one directionality of at least one audio source from the at least two audio signals, determine at least one timing of the at least one audio source from the at least two audio signals, generate at least one context for the at least two audio signals based on the at least one directionality and the at least one timing of the at least two audio signals and provide at least one user interface based on the generated at least one context.

In a further embodiment, apparatus comprising at least two microphones configured to determine at least two audio signals, a signal processor configured to perform at least one of determine at least one directionality of at least one audio source from the at least two audio signals, determine at least one timing of the at least one audio source from the at least two audio signals, generate at least one context for the at least two audio signals based on the at least one directionality and the at least one timing of the at least two audio signals, and provide at least one user interface based on the generated at least one context.

In another embodiment, the present application also allows for the initialization of an interface on the device of a user based upon reception of particular sound(s) wherein the sound(s) reflect a specific scenario that is analyzed and determined by the current application. This interface allows for scenario-dependent interaction allowing further functionality that enhances the user's interaction with the current scenario.

A further embodiment allows for the application to dissect incoming sounds and provide interactions accordingly based on an initial initiation of an interface by the user. This embodiment allows for an initial interface through a first interaction of the user with the device then processes incoming sounds to the device in the context of the first interface.

BRIEF DESCRIPTION OF THE DRAWINGS

FIG. 1 displays a possible implementation of a current system in accordance with an embodiment of the instant application.

FIG. 2 displays an example cellular call context system in accordance with an embodiment of the instant application.

FIG. 3 illustrates a first example of audio signal timing diagram of a cellular call context in accordance with an embodiment of the instant application.

FIG. 4 illustrates a second example of an audio signal timing diagram of a cellular call context in accordance with an embodiment of the instant application.

FIG. 5 illustrates a flow diagram of a cellular call context method in accordance with an embodiment of the instant application.

FIG. 6 illustrates a non-transitory computer readable medium flow diagram of a cellular call context in accordance with an embodiment of the instant application.

FIG. 7 illustrates an apparatus system flow diagram of a cellular call context in accordance with an embodiment of the instant application.

FIG. 8 illustrates a first user interface of a cellular call context in accordance with an embodiment of the instant application.

FIG. 9 illustrates a second user interface of a cellular call context in accordance with an embodiment of the instant application.

FIG. 10 illustrates a third user interface of a cellular call context in accordance with an embodiment of the instant application.

FIG. 11 illustrates a fourth user interface of a cellular call context in accordance with an embodiment of the instant application.

FIG. 12 is a flowchart of a possible implementation of a current application depicting a first example of an interface initialization in accordance with an embodiment of the instant application.

FIG. 13 is a flowchart of a possible implementation of a current application depicting a second example of an interface initialization in accordance with an embodiment of the instant application.

DETAILED DESCRIPTION

It may be readily understood that the components of the present application, as generally described and illustrated in the figures herein, may be arranged and designed in a wide variety of different configurations. Thus, the following detailed description of the examples of a method, apparatus, and system, as represented in the attached figures, is not intended to limit the scope of the application as claimed, but is merely representative of selected examples of the application.

The features, structures, or characteristics of the application described throughout this specification may be combined in a suitable manner in one or more examples. For example, the usage of the phrases example, examples, some examples, or other similar language, throughout this specification refers to the fact that a particular feature, structure, or characteristic described in connection with the example may be included in at least one example of the present application. Thus, appearances of the phrases example, examples, in some examples, in other examples, or other similar language, throughout this specification does not necessarily refer to the same group of examples, and the described features, structures, or characteristics may be combined in a suitable manner in one or more examples.

The disclosure discusses in part an application resident on a user device. The device may be a computer, laptop, mobile, wireless or cellular phone, a PDA, a tablet, a client, a server or a device that contains a processor and/or memory, whether that processor or memory performs a function related to an example. The present application discussed throughout the disclosure may work with a device, such as a personal computer, a laptop, a personal computing tablet, a smartphone or a device with a processor and memory.

FIG. 1 displays a possible implementation of the current system 50. The user device 54 included herein contains a computer memory 56, a computer processor 58, and other elements normally included in a device, not depicted. The user device be, for example, a PDA, an MP3 player or any other wireless device, a gaming device (such as a hand held system or home based system) and the like (including a personal computer or other wired device) that can also transmit and receive information. The user device may be a mobile device, a wearable computer, a tablet, gaming system, desktop computer, laptop computer, or any other device that is either portable or non-portable. It may be a mobile device, or a device that is either directly connected to a network (for example, the Internet), or wirelessly connected to said network.

There exists a network 52 which may be the Internet or any other type of network. The user device is connected to the network such that messaging occurs between the network and user device allowing the user device to communicate with both the network and entities beyond the network.

FIG. 2 displays an example cellular call context system 100. A user device 110 having a first microphone 112 and a second microphone 114 receives a first acoustic signal 116 having a first timing 118, a second acoustic signal 120 having a second timing 122 and a third acoustic signal 124 having a third timing 126. The reception of the first acoustic signal on the first and second microphones having a received timing delta indicates directionality. Additionally, the second and third acoustic signals are also received with timing offsets at the first and second microphones, which indicate a directionality of those acoustic signals. In addition to the directionality, the separation of the acoustic signals indicates a potential context.

FIG. 3 illustrates a first example of audio signal timing diagram 200 of the cellular call context. The overlap of acoustic signals 210, 212 and 214 would tend to indicate that the other acoustic signals are noise and that those signals be reduced in gain.

FIG. 4 illustrates a second example of audio signal timing diagram 300 of the cellular call context. The separation of acoustic signals 310, 312 and 314 would tend to indicate that the other acoustic signals are a teleconference and that those signals be increased in gain. In one example a conference may be based on separation of trajectories and separation of audio signal timing.

FIG. 5 illustrates a flow diagram of the cellular call context method 400. The method 400 comprises determining 410 at least two audio signals, determining 412 at least one directionality of at least one audio source from the at least two audio signals and determining 414 at least one timing of the at least one audio source from the at least two audio signals. The method also comprises generating 416 at least one context for the at least two audio signals based on the at least one directionality and the at least one timing of the at least two audio signals and providing 418 at least one user interface based on the generated at least one context.

The method may also comprise adjusting 420 a device brightness based on context and adjusting 422 a device volume based on context. The at least two audio signals may represent one audio source, the at least one user interface may display the at least one most probable context, the at least two most probable contexts based on the generated at least one context and the context may be based on a global position signal.

FIG. 6 illustrates a non-transitory computer readable medium flow diagram 500 of the cellular call context. The apparatus 500 comprising at least one processor 510 and at least one non-transitory computer readable storage medium 512 including computer code for one or more programs, the at least one non-transitory computer readable storage medium and the computer code configured to with the at least one processor cause the apparatus at least to determine 514 at least two audio signals, determine 516 at least one directionality of at least one audio source from the at least two audio signals and determine 518 at least one timing of the at least one audio source from the at least two audio signals.

The apparatus also causes the processor to generate 520 at least one context for the at least two audio signals based on the at least one directionality and the at least one timing of the at least two audio signals and provide 522 at least one user interface based on the generated at least one context. The apparatus may also comprise code to separate 524 conferee audio signals based on said directionality, query 526 a user of a possible generated context and adjust 528 gain based on separation of directionality and overlap of said audio signal timings. The generated context comprises a conference based on separation of directionality and separation of said audio signal timing, a movement to an enclosed area and a utilization of a smart watch.

FIG. 7 illustrates an apparatus system flow diagram 600 of the cellular call context. The apparatus 600 comprising at least two microphones 610 configured to determine 612 at least two audio signals, a signal processor 614 configured to determine 616 at least one directionality of at least one audio source from the at least two audio signals, determine 618 at least one timing of the at least one audio source from the at least two audio signals, generate 620 at least one context for the at least two audio signals based on the at least one directionality and the at least one timing of the at least two audio signals and provide 622 at least one user interface based on the generated at least one context. The apparatus may also comprise code to separate 624 conferee audio signals based on said directionality, query 626 a user of a possible generated context and adjust 628 gain based on separation of directionality and overlap of said audio signal timings. The generated context comprises a conference based on separation of directionality and separation of said audio signal timing, a movement to an enclosed area and a utilization of a smart watch.

In an alternate embodiment one audio signal may be analyzed for content. The location of device may be ascertained by directionality of audio sources, ambient audio volume, ambient audio content, global positioning position of the device or other space based satellite navigation or Earth based navigation systems and the like. The device may respond by displaying various user interfaces, modifying visual appearance brightness, volume and ringing. The audio volume may also be adjusted based on context such as for a movie theater, in which the screen is dimmed, the phone is silenced and placed in vibrate mode, the speaker volume is reduced and a user interface for food ordering or the like may be called. Another example would be where the cell phone is utilized in a concert in which the volume is raised and active noise cancellation is called up. In a further example in which the device is used on a subway in which noise cancellation and volume are automatically adjusted.

FIG. 8 illustrates a first user interface 700 of the cellular call context. A cell phone 710 having a screen 712 displaying a first user interface which is expanded from a menu at the top of the screen having buttons 714, 716 and 718 representing contexts to choose from; the menu at the top of the screen giving the user a choice of most probable contexts.

FIG. 9 illustrates a second user interface 800 of the cellular call context. An alternate embodiment having a cell phone 810 with two of the most probable contexts 812 and 814 are displayed.

FIG. 10 illustrates a third user interface 900 of the cellular call context. An alternate embodiment having a cell phone 910 with two of the most probable contexts 912 which displays recording the conversation and 914 which displays documents to choose from.

In another embodiment a method comprising, determining at least audio signal, determining at least one secondary characteristic of at least one audio source from the at least two audio signals, determining at least one directionality based on the at least one audio signal and the at least one secondary characteristic of the at least one audio signal, determining at least one timing of the at least one audio source from the at least on audio signal and the at least one secondary characteristic of at least one audio source, generating at least one context for the at least one directionality and the at least one timing and providing at least one user interface based on the generated at least one context.

The method may further comprise adjusting a device brightness based on the context and adjusting a device volume based on the context. The at least two audio signals may represent one audio source, the at least one user interface may further display the at least one most probable context based on the generated at least one context, the at least one user interface may further display the at least two most probable contexts based on the generated at least one context and the at least one context may be based on a global position signal.

In a further embodiment an apparatus comprising at least one processor and at least one memory including computer code for one or more programs, the at least one memory and the computer code configured to with the at least one processor cause the apparatus at least to, determine at least audio signal, determine at least one secondary characteristic of at least one audio source from the at least two audio signals, determine at least one directionality based on the at least one audio signal and the at least one secondary characteristic of the at least one audio signal, determine at least one timing of the at least one audio source from the at least on audio signal and the at least one secondary characteristic of at least one audio source, generate at least one context for the at least one directionality and the at least one timing and provide at least one user interface based on the generated at least one context.

The apparatus may further comprise separating conferee audio signals based on the directionality, reduce gain based on separation of directionality and overlap of the at least one timing of the at least one audio source and query at least one user of a possible generated context. The generated at least one context may comprise the conference may be based on separation of trajectories and separation of the audio signal timing, the generated at least one context may comprise a movement to an enclosed area and the generated at least one context may comprise a utilization of a smart watch.

In another embodiment at least two microphones configured to determine at least two audio signals, a signal processor configured to determine at least audio signal, determine at least one secondary characteristic of at least one audio source from the at least two audio signals, determine at least one directionality based on the at least one audio signal and the at least one secondary characteristic of the at least one audio signal, determine at least one timing of the at least one audio source from the at least on audio signal and the at least one secondary characteristic of at least one audio source, generate at least one context for the at least one directionality and the at least one timing, and provide at least one user interface based on the generated at least one context.

The may further comprise separating conferee audio signals based on the directionality and querying at least one user of a possible generated context. The generated at least one context may comprise the conference based on separation of trajectories and separation of the audio signal timing, the generated at least one context comprises a movement to an enclosed area and the generated at least one context comprises a utilization of a smart watch.

A method comprising, detecting at least two networked devices, training a cellular phone based on the at least two networked devices, generating at least one context based on the at least two networked devices, controlling at least one of said at least two networked devices and providing at least one user interface based on the generated at least one context.

The method may further comprise adjusting a device brightness based on context and adjusting a device volume based on context. The at least one user interface may further display the at least one most probable context based on the generated at least one context or display the at least two most probable contexts based on the generated at least one context. The at least one context may be based on a global position signal. The method may generate the at least one context based on active training and passive training.

An apparatus comprising at least one processor and at least one memory including computer code for one or more programs, the at least one memory and the computer code configured to with the at least one processor cause the apparatus at least to, detect at least two networked devices, train a cellular phone based on the at least two networked devices, generate at least one context based on the at least two networked devices, control at least one of said at least two networked devices and provide at least one user interface based on the generated at least one context.

The apparatus may further comprise separating conferee audio signals based on the directionality, reduce gain based on separation of directionality and overlap of the at least one timing of the at least one audio source and query at least one user of a possible generated context. The generated at least one context may comprise a movement to an enclosed area and a utilization of a smart watch.

FIG. 11 illustrates a fourth user interface 1000 of the cellular call context. An alternate embodiment having a cell phone 1010 having user interfaces UI1 1012 and UI2 1014 which dynamically change to user interfaces UI1 1012 and UI3 1016 with time based on context.

The operations of a method or algorithm described in connection with the examples disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example a network element, this may represent any of the above described network components, etc.

Although an exemplary example of at least one of the system, method, and non-transitory computer readable medium of the present disclosure has been illustrated in the accompanied drawings and described in the foregoing detailed description, it will be understood that the application is not limited to the examples disclosed, and is capable of numerous rearrangements, modifications, and substitutions without departing from the spirit or scope of the disclosure as set forth and defined by the following claims. For example, one or more of the modules or components described herein or in a distributed architecture can perform the capabilities of the systems.

The above examples are for illustrative purposes and are not intended to limit the scope of the disclosure or the adaptation of the features described herein to particular components. Those skilled in the art will also appreciate that various adaptations and modifications of the above described preferred examples can be configured without departing from the scope and spirit of the disclosure. Therefore, it is to be understood that, within the scope of the appended claims, the disclosure may be practiced by examples in addition to those specifically described.

FIG. 12 is a flowchart of a possible implementation of the current application depicting a first example of the interface initialization 3000. In this implementation, the user has not initialized the interface on the device 54 prior to the incoming sound 3025. The device 54 is in a state wherein the incoming at least two audio signals are received and processed 3005.

Based on the directionality and at least one timing of the at least two audio signals, at least one context is determined 3010. An interface is determined and initialized according to the at least one context 3015. The interface is displayed on the device's 54 display 3020.

The interface presented to the display of the device 54 corresponds to the analysis of the incoming at least two audio signals 3025 received by the device 54 and is based on the at least one context determined.

FIG. 13 is a flowchart of a possible implementation of the current application depicting a second example of the interface initialization 3500. In this implementation, the user first initializes the interface on the device 3505. The device 54 is in a state wherein the incoming at least two audio signals 3520 are received and analyzed 3510. The incoming at least two audio signals 3520 are received in the context of the interface executing on the device 54.

Based on the directionality and at least one timing of the at least two audio signals 3520, the interface is updated as related to the incoming at least two audio signals 3515.

Example 1

A user is in a meeting with 7 other individuals. The user has the device 54. The application is running on the device 54 and no particular program and/or no particular interface is currently executing on the device 54.

Based on the received audio to the device 54 and based on the characteristics of the incoming audio (direction, sound, number of different received audio signals, etc.), the device 54 determines that the user is in a meeting with 7 other people. Or the device 54 determines that the user is in a meeting with a undetermined number of members.

An interface is automatically executed on the device wherein the user may perform specific related meeting functions. These functions may include but are not limited to:

- A component (for example a button component) that when pressed begins to utilize the recording application on the device 54 to record all audio received.
- Upon analysis of the incoming audio, the application may perform processing (either internal to the device 54 or through published APIs) wherein additional information is presented to the user regarding the topic being discussed in the meeting. Links are provided in the presented data that when clicked provide additional information (such as webpages).
- Project plans are obtained and presented to the user through the interface on the device 54 through interfacing with either internal (intranet) access to the organization's local repository(s) and/or external access through the Internet and/or the data Network.

The device first receives the at least two audio signals and according to the characteristics of the incoming audio, determines an interface related to the analysis of the incoming audio and presents the interface to the user wherein the user's experience is improved in the current scenario through the use of the interface.

If the incoming audio signals reflect people discussing, the application can determine that a meeting is occurring and therefore initiate an interface reflecting a meeting.

If the incoming audio reflects a movie theater (such that the sound is quiet followed by loud music and dialog), the application determines that the user is in a theater and therefore will initiate an interface for that scenario. The interface may automatically silence the device 54 and or set the notification to vibrate, alter the brightness of the device to a dim setting, etc. Once the application determines that the user has left the movie, the interface interfaces with external data through the Internet and/or network to display interesting facts about the movie, characters in the movie, actors and actresses in the movie, allow the user to rate the movie, read blogs about the movie, etc.

Example 2

The user first enables an interface on the device 54 by interacting with the device as a first action. This action may be (for example) using the device 54 to power up the audio/video equipment at the user's home. This action initializes the interface on the device 54 wherein the user is able to interact with the interface to browse through audio/video options, change the channel on the audio/video device(s), etc.

In this example, the application does not need to determine the source of the incoming audio as it is previously aware of the source of the audio through the already established interface. Therefore, through both the received audio and the understanding of what the user is performing through the interface, the interface can be updated.

The user is viewing a football game as can be analyzed through the analysis of the received at least two audio signals. The interface can offer facts about the current football game that may be of interest to the user. For example:

- General information about the teams currently playing: player statistics, team standings, league standings.
- If a running back (for example) makes a high yardage run, the application automatically obtains statistics on that running back and displays it automatically to the application. For example, how many yards the player has in the game, average number of yards in each of the game this year, for all time, etc. Also how many yards the players has at each situation in the game (per half, per down, per formation, etc.).
- Interesting overall fact about the teams playing such as school information and links, information about purchasing tickets to upcoming games.
- Offer a chance to begin to record the game or offer information of where to be able to view the game online or when the game will be rebroadcast in the future, etc.
- Offer the ability to connect the user with other users that retain the same or similar interest in the sport, the league, the team, the players, etc. This connection can be through an online blog, online chat session, etc.

In this example, the user initializes the interface as a first action the according to the received audio streams, the interface automatically alters to offer the user an immersive experience based on the experience offered through the initial interface.

Although an exemplary embodiment of the instant system, method, and non-transitory computer readable medium has been illustrated in the accompanied drawings and described in the foregoing detailed description, it will be understood that they are not limited to the embodiments disclosed, but is capable of numerous rearrangements, modifications, and substitutions without departing from the spirit or scope of the embodiments as set forth and defined by the following claims. For example, the capabilities of the various systems can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope in any way, but is intended to provide one example of various embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components herein, as generally described and illustrated in the figures herein, may be arranged and designed in a wide variety of different configurations.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising:
   determining at least one directionality of at least one audio source from at least two audio signals received by a device;
   determining at least one timing of the at least one audio source from the at least two audio signals;
   generating at least one context for the at least two audio signals based on the at least one directionality and the at least one timing of the at least two audio signals;
   adjusting an initial output on at least one user interface of the device based on the generated at least one context;
   identifying at least one second user that has an interest in the at least one context;
   providing information associated with the at least one second user to the at least one user interface of the device; and
   providing a connection between the at least one second user and the at least one user interface.

2. The method of claim 1, wherein the initial output includes audio data, video data or a combination of audio data and video data.

3. The method of claim 1, comprising adjusting a brightness level output on the device based on the at least one context.

4. The method of claim 1, comprising adjusting a volume level output on the device based on the at least one context.

5. The method of claim 1, wherein the at least two audio signals represent one audio source.

6. The method of claim 1, wherein the at least one user interface outputs at least one most probable context, based on the generated at least one context.

7. The method of claim 6, wherein the at least one most probable context is based on a global position signal.

8. A non-transitory computer readable medium comprising instructions that when executed by a processor, cause the processor to perform:
   determining at least one directionality of at least one audio source from at least two audio signals received by a device;
   determining at least one timing of the at least one audio source from the at least two audio signals;
   generating at least one context for the at least two audio signals based on the at least one directionality and the at least one timing of the at least two audio signals;
   adjusting initial output on at least one user interface of the device based on the generated at least one context;
   identifying at least one second user that has an interest in the at least one context;
   providing information associated with the at least one second user to the at least one user interface of the device; and
   providing a connection between the at least one second user and the at least one user interface.

9. The non-transitory computer readable medium of claim 8, wherein the initial output includes audio data, video data or a combination of audio data and video data.

10. The non-transitory computer readable medium of claim 8, comprising instructions that when executed by a processor, cause the processor to perform adjusting a brightness level output on the device based on the at least one context.

11. The non-transitory computer readable medium of claim 8, comprising instructions that when executed by a processor, cause the processor to perform adjusting a volume level output on the device based on the at least one context.

12. The non-transitory computer readable medium of claim 8, wherein the at least two audio signals represent one audio source.

13. The non-transitory computer readable medium of claim 8, wherein the at least one user interface outputs at least one most probable context, based on the generated at least one context.

14. The non-transitory computer readable medium of claim 13, wherein the at least one most probable context is based on a global position signal.

15. A system, comprising:
   memory; and
   a processor;
   wherein the memory and processor are communicably coupled to one another;
   wherein the processor is configured to:
      determine at least one directionality of at least one audio source from at least two audio signals received by a device;
      determine at least one time of the at least one audio source from the at least two audio signals;

generate at least one context for the at least two audio signals based on the at least one directionality and the at least one time of the at least two audio signals;

adjust an initial output on at least one user interface of the device based on the generated at least one context;

identify at least one second user that has an interest in the at least one context;

provide information associated with the at least one second user to the at least one user interface of the device; and provide a connection between the at least one second user and the at least one user interface.

16. The system of claim 15, wherein the initial output includes audio data, video data or a combination of audio data and video data.

17. The system of claim 15, wherein the processor is configured to perform at least one of:

adjust a device brightness based on the at least one context; and adjust a device volume based on the at least one context.

18. The system of claim 15, wherein the at least two audio signals represent one audio source.

19. The system of claim 15, wherein the at least one user interface outputs at least one most probable context, based on the generated at least one context.

20. The system of claim 19, wherein the at least one most probable context is based on a global position signal.

* * * * *